United States Patent
Lin et al.

(10) Patent No.: US 8,296,556 B2
(45) Date of Patent: Oct. 23, 2012

(54) SYSTEM AND METHOD FOR PROCESSING BOOTING FAILURE OF SYSTEM

(75) Inventors: Chih-Shien Lin, Taipei (TW); Yi-Chun Tsai, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 400 days.

(21) Appl. No.: 12/683,808

(22) Filed: Jan. 7, 2010

(65) Prior Publication Data

US 2010/0191950 A1 Jul. 29, 2010

(30) Foreign Application Priority Data

Jan. 23, 2009 (TW) ................. 98102811 A

(51) Int. Cl.
*G06F 15/177* (2006.01)
*G06F 9/00* (2006.01)
*G06F 12/00* (2006.01)
*G06F 11/00* (2006.01)

(52) U.S. Cl. ............ 713/2; 713/1; 711/5; 711/170; 711/221; 714/6.1; 714/36; 714/42

(58) Field of Classification Search ............ 713/1, 2; 711/5, 170, 221; 714/6.1, 36, 42
See application file for complete search history.

(56) References Cited

U.S. PATENT DOCUMENTS

| | | | |
|---|---|---|---|
| 7,254,744 B2 | 8/2007 | Dunstan et al. | |
| 7,340,638 B2 | 3/2008 | Nicholson et al. | |
| 7,707,369 B2 * | 4/2010 | Nulkar et al. | 711/156 |
| 7,796,457 B2 * | 9/2010 | Hsu et al. | 365/226 |
| 8,006,062 B1 * | 8/2011 | Cheng et al. | 711/170 |
| 2005/0257095 A1 * | 11/2005 | Rapaich | 714/42 |
| 2008/0244255 A1 | 10/2008 | Chen et al. | |

FOREIGN PATENT DOCUMENTS

CN   1924808 A   3/2007

OTHER PUBLICATIONS

English translation of abstract of CN 1924808 A.

* cited by examiner

*Primary Examiner* — Stefan Stoynov
(74) *Attorney, Agent, or Firm* — Thomas, Kayden, Horstemeyer & Risley, LLP

(57) ABSTRACT

A method for processing booting failure of a computer system is adapted for being performed at a computer. The method includes the following steps. First, a parameter selecting signal is generated according to a triggering signal by a control module. Second, a driving parameter is chosen from a look-up table according to the parameter selecting signal by a basic input output system (BIOS), and the driving parameter is loaded into the BIOS and provided to a driving module. Third, a memory is driven according to the driving parameter by the driving module. Fourth, the driving parameter is stored by BIOS.

12 Claims, 3 Drawing Sheets

LT

| $S_c$ | Voltage | Command Rate | SPDAddr Mapp | tCL | tRCD | tRP | tRAS | Frequency |
|---|---|---|---|---|---|---|---|---|
| 1 | 1.70988V | 2 * Clock | Default | 9 * Clock | 9 * Clock | 9 * Clock | 24 * Clock | Default |
| 2 | 1.70988V | 2 * Clock | Default | 8 * Clock | 8 * Clock | 8 * Clock | 20 * Clock | Default |
| 3 | 1.70988V | 3 * Clock | Default | Default | Default | Default | Default | Default |
| 4 | 1.70988V | 2 * Clock | 1 | Default | Default | Default | Default | Default |
| 5 | 2.00149V | 2 * Clock | Default | 9 * Clock | 9 * Clock | 9 * Clock | 24 * Clock | Default |
| 6 | 2.00149V | 2 * Clock | Default | 8 * Clock | 8 * Clock | 8 * Clock | 20 * Clock | Default |
| 7 | 2.00149V | 3 * Clock | Default | Default | Default | Default | Default | Default |
| 8 | 2.00149V | 2 * Clock | 1 | Default | Default | Default | Default | Default |
| 9 | 1.70988V | 2 * Clock | Default | 9 * Clock | 9 * Clock | 9 * Clock | 28 * Clock | Default |
| 10 | 1.70988V | 2 * Clock | Default | 8 * Clock | 8 * Clock | 8 * Clock | 24 * Clock | Default |
| 11 | 2.00149V | 2 * Clock | Default | 9 * Clock | 9 * Clock | 9 * Clock | 28 * Clock | Default |
| 12 | 2.00149V | 2 * Clock | Default | 8 * Clock | 8 * Clock | 8 * Clock | 24 * Clock | Default |
| 13 | 2.20031V | Default | Default | Default | Default | Default | Default | Default |
| 14 | 1.51106V | Default | Default | Default | Default | Default | Default | Default |
| 15 | 1.70988V | 2 * Clock | Default | 6 * Clock | 6 * Clock | 6 * Clock | 18 * Clock | 800MHz |

SYSTEM AND METHOD FOR PROCESSING BOOTING FAILURE OF SYSTEM

CROSS REFERENCE TO RELATED APPLICATIONS

This Non-provisional application claims priority under 35 U.S.C. §119(a) on Patent Application No(s). 098102811 filed in Taiwan, Republic of China on Jan. 23, 2009, the entire contents of which are hereby incorporated by reference.

BACKGROUND OF THE INVENTION

1. Field of Invention

The invention relates to a processing device and a processing method and, more particularly, to a system and a method for processing booting failure of a system.

2. Related Art

In recent years, along with popularization of wireless networks and personal computers, common people have basic knowledge about a computer. Consequently, many people assemble do it yourself (DIY) computers to consider the cost or improve specific efficiency.

A memory is one of the most important elements for making the computer operate, and it should be driven first in a boot procedure of the computer. Generally speaking, the operating voltage and parameters needed by the memory are stored in a serial presence detect (SPD) of the memory. The SPD is a group of configuration information such as the number of P-Bank, voltage, the number of column address/row address, bit wide, kinds of operation timing (such as CL, tRCD, tRP, tRAS) related to a memory module, and the information is stored in a 256-byte electrically erasable program able read only memory (EEPROM).

Timing information in the SPD is compiled and written to the EEPROM by a module manufacturer according to a characteristic of a used memory chip, and it is mainly used for assisting a north bridge chip in accurately adjusting physical/timing parameters of the memory to obtain an optimal using effect.

To a DIY computer, if the memory is assembled on motherboards with different brands, an operating voltage parameter or a timing controlling parameter provided to the memory by a basic input output system (BIOS) in the motherboard may not meet the requirement of the memory due to different brands. As a result, the computer cannot be booted or operate. Nowadays, a user usually replaces the memory by another with a different brand by him or her to solve the booting problem.

As a result, how to provide a system and a method for processing booting failure of a system to allow memories with different operating voltages and the timing controlling parameters to be assembled on a motherboard and make the computer normally operate becomes one of important subjects.

SUMMARY OF THE INVENTION

In view of the subject as stated above, the purposes of the invention is to provide a system and a method for processing booting failure of a system to reduce the probability of generating incompatibility between the memory and the motherboard and make the computer normally booted and operate.

According to an aspect of the invention, a device for processing booting failure of a system is disposed at a computer. The processing device includes a control module, a BIOS, and a driving module. The control module generates a parameter selecting signal according to a triggering signal. The BIOS selects a driving parameter according to the parameter selecting signal from a look-up table and loads the driving parameter. The driving module drives a memory according to the driving parameter.

According to another aspect of the invention, a method of system booting failure is adapted for being performed at a computer. The method includes the following steps. First, a parameter selecting signal is generated by the control module according to a triggering signal. Second, a driving parameter is chosen from a look-up table according to the parameter selecting signal by BIOS, loaded into the BIOS, and provided to a driving module. Third, a memory is driven by a driving module according to the driving parameter. Fourth, the driving parameter is stored by the BIOS.

According to an embodiment of the invention, the processing device further includes a triggering signal generating module such as a button or a switch, and it generates the triggering signal.

According to an embodiment of the invention, the look-up table and the BIOS may be stored at the same storage unit or in different storage units, respectively.

These and other features, aspects and advantages of the present invention will become better understood with regard to the following description, appended claims, and accompanying drawings.

BRIEF DESCRIPTION OF THE DRAWINGS

FIG. 2 is a look-up table when a system fails to be booted according to a preferred embodiment of the invention.

DETAILED DESCRIPTION OF THE INVENTION

A device for processing booting failure of the system and a method thereof are illustrated accompanying related drawings hereinafter. The same component numbers denote the same components.

Figure 1:
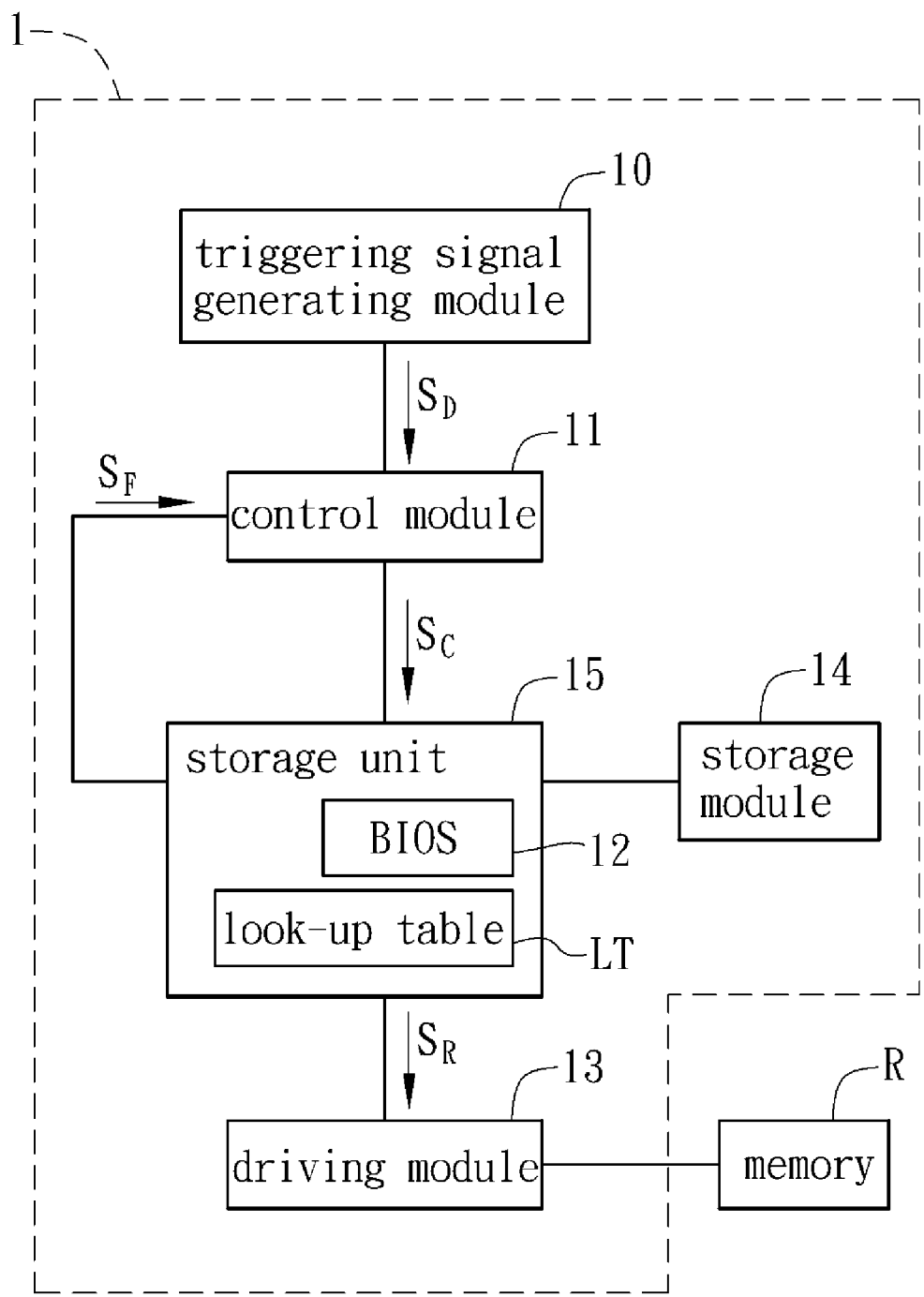
FIG. 1 is a schematic diagram showing a device for processing booting failure of a system according to a preferred embodiment of the invention.

FIG. 1 is a schematic diagram showing a processing device 1 for processing booting failure of a system according to a preferred embodiment of the invention. The processing device 1 includes a control module 11, a BIOS 12, a driving module 13, and a storage module 14. In this embodiment, the processing device 1 is disposed on a motherboard of a computer.

The processing device 1 in this embodiment further includes a triggering signal generating module 10 having a button or a switch. When the memory cannot be driven successfully, which makes the computer down in booting, a user may utilize the triggering signal generating module 10 to transmit a triggering signal $S_D$ to the control module 11. In this embodiment, the triggering signal $S_D$ may be generated after the user operates a button or a switch by himself or herself. Additionally, the triggering signal generating module 10 may be disposed on the motherboard in this embodiment. However, the triggering signal generating module 10 also may be disposed at any position of the computer that the user may touch easily, and the position is not limited herein.

The control module 11 generates a parameter selecting signal $S_C$ according to the triggering signal $S_D$. In this embodiment, the control module 11 may be a watchdog program having a counter and a timer. The counter is used for recording the number of times of the booting failure of the computer. The timer is used for monitoring booting time of a computer system. When the computer is booted, the timer starts to count time. When the driving module 13 of the motherboard cannot drive a memory R, and the booting time exceeds a predetermined time in the timer or a hang occurs in boot procedure, which represents that the boot procedure fails, a count value of the counter in the control module 11 is increased by one (it represents that a booting process is performed once). Additionally, when the computer re-performs the boot procedure, the timer of the control module 11 is cleared and re-counts time.

The parameter selecting signal $S_C$ is a count value of the counter. The count value is predetermined to be zero. That is, when the computer performs the booting process once, the count value of the counter is increased by one, and the parameter selecting signal $S_C$ is one at the time. A method of calculating the count value of the counter may be various according to different demands (For example, the count value may be increased by two, three, or four at a time). Furthermore, the predetermined time of the timer may be thirty seconds or various according to different demands.

The BIOS 12 selects a driving parameter $S_R$ from a look-up table LT according to the parameter selecting signal $S_C$ and loads the driving parameter $S_R$ to the BIOS 12. Consequently, when the computer is rebooted, the BIOS 12 can provide a new driving parameter $S_R$ to the driving module 13, and the driving module 13 drives the memory R. In this embodiment, the look-up table LT may be stored in a storage unit 15, and the look-up table LT stores a group of the driving parameters (as shown in FIG. 2) therein. However, the BIOS 12 only loads a group of the driving parameters $S_R$ in each boot procedure.

FIG. 2 is a schematic diagram showing contents of a look-up table of the processing device 1 in this embodiment. The leftmost column shows the value of the parameter selecting signal $S_C$, and the value may be one to thirteen-five. The driving parameter $S_R$ corresponding to the parameter selecting signal $S_C$ may include an operating voltage, a command rate, SPDAddrMapp, tCL, tRCD, tRP, tRAS, and an operation frequency (frequency) and so on. As shown in FIG. 2, when the parameter selecting signal $S_C$ is one, the driving parameter $S_R$ is shown as follows. That is, the voltage is 1.70988 volts (V), the command rate is 2 Clock, the SPDAddrMapp is Default, the tCL is 9 Clock, the tRCD is 9 Clock, the tRP is 9 Clock, the tRAS is 24 Clock, and the frequency is Default (the values of each group of driving parameters may be used as reference values for driving the memory).

Additionally, in this embodiment, the BIOS 12 and the look-up table LT are disposed in the storage unit 15. The BIOS 12 and the look-up table LT also may be disposed in the storage unit 15 and the storage module 14, respectively in other embodiments.

The driving module 13 drives the memory R according to the driving parameter $S_R$. In this embodiment, the driving module 13 may include a south bridge chipset or a north bridge chipset, and the memory R may be a random access memory (RAM).

If the computer can be normally booted via the re-loaded of the driving parameter $S_R$ in a predetermined time (such as thirty seconds), the BIOS 12 records the driving parameter $S_R$ with which the memory R is successfully driven according to a driving success signal at the time. Then, when the computer is booted next time, the BIOS boot the computer and drive the memory R by directly utilizing the group of driving parameters.

When the computer cannot be booted normally, and the driving module 13 cannot drive the memory R, the BIOS 12 transmits a driving failure signal $S_F$ to the control module 11 and the count value of the counter in the control module 11 is increased by one. At the time, the count value of the counter is changed to two, the value of the parameter selecting signal $S_C$ is also two, and the system of the computer is rebooted. Then, another driving parameter $S_R$ is looked up in the look-up table LT in FIG. 2, and the memory R is driven with this driving parameter $S_R$. The procedure as stated above is repeatedly performed until the memory R is successfully driven by analogy.

Figure 3:
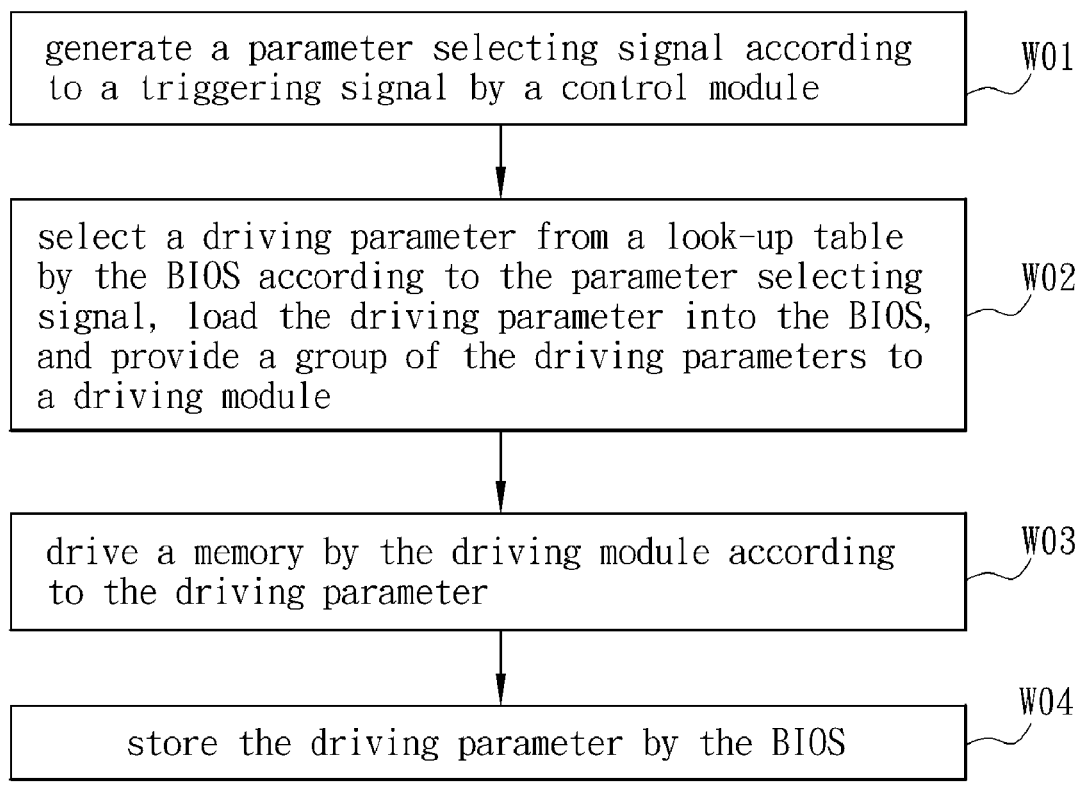
FIG. 3 is a flow chat showing a method for processing booting failure of a system according to a preferred embodiment of the invention.

FIG. 3 is a flow chat showing a method of system booting failure according to a preferred embodiment of the invention. The method of system booting failure according to a preferred embodiment of the invention is adapted for being performed at a computer. The method includes steps W01 to W04.

In step W01, the control module 11 generates a parameter selecting signal $S_C$ according to a triggering signal $S_D$. The triggering signal $S_D$ is generated by the triggering signal generating module 10 in this embodiment. The control module 11 generates the parameter selecting signal $S_C$ according to the triggering signal $S_D$, and it increases the count value of the counter by one at the same time and re-performs the boot procedure. Additionally, the initial value of the counter is zero, and the predetermined time is thirty seconds. The initial value of the counter is zero, and the value of the parameter selecting signal $S_C$ is changed along with the change of the count value of the counter. For example, the count value of the counter is equal to the value of the parameter selecting signal $S_C$ in this embodiment. Therefore, when the count value of the counter is increased once from zero, the count value of the counter is one, and the value of the parameter selecting signal $S_C$ is also one.

In step W02, the driving parameter $S_R$ is chosen from the look-up table LT according to the parameter selecting signal $S_C$ and loaded by the BIOS 12. In this embodiment, the parameter selecting signal $S_C$ is transmitted to the BIOS 12 by the control module 11, and a group of the driving parameters $S_R$ corresponding to the parameter selecting signal $S_C$ is chosen from the look-up table LT in the storage unit 15 by the BIOS 12 according to the value of the parameter selecting signal $S_C$. Then, the group of the driving parameters $S_R$ is provided to the driving module 13 by the BIOS 12.

In step W03, the memory R is driven by the driving module 13 according to a re-chosen driving parameter $S_R$. In this embodiment, the driving module 13 may include the north bridge chipset or the south bridge chipset, and the memory R is driven via the driving parameter $S_R$ chosen in step W02.

In step W04, the driving parameter $S_R$ is stored by the BIOS 12 according to the driving success signal.

In this embodiment, when the driving module successfully drives the memory R, the BIOS 12 receives the driving success signal and stores the driving parameter $S_R$ with which the memory R is successfully driven in the storage module 14. When the driving module 13 fails to drive the memory R, the BIOS 12 generates the driving failure signal $S_F$ and transmits the driving failure signal $S_F$ back to the control module 11 to re-perform the step W01.

To sum up, according to the device for processing booting failure of the system and the method thereof of the invention, a look-up table for looking up parameters for driving the memory is built in a motherboard, and it stores a group driving parameters. When the boot process fails due to the failure of driving the memory, the BIOS drives the memory orderly by utilizing a group of the driving parameters in the look-up table until the memory is successfully driven. After the memory is successfully driven, the driving parameters with which the memory is successfully driven are stored in the BIOS. Thus, when the computer is used next time, the driving parameter driving the memory can be directly used to reduce the probability of generating incompatibility between the memory and the motherboard and make the computer normally booted and operate.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for processing booting failure of a system, adapted for being performed at a computer, the method comprising:
   generating a parameter selecting signal by a counter of a control module according to a triggering signal while a memory is not successfully driven;
   selecting a driving parameter from a look-up table according to the parameter selecting signal by a basic input output system (BIOS), loading the driving parameter into the BIOS, and providing the driving parameter to a driving module;
   driving the memory by the driving module according to the driving parameter; and
   storing the driving parameter by the BIOS.

2. The method according to claim 1, further comprising:
   generating the triggering signal by a triggering signal generating module.

3. The method according to claim 1, further comprising:
   generating a driving failure signal by the BIOS and transmitting the driving failure signal to the control module when the memory is not driven successfully.

4. The method according to claim 3, wherein the driving failure signal is generated after a predetermined time.

5. The method according to claim 1, wherein the system is rebooted after the parameter selecting signal is generated.

6. A device for processing booting failure of a system, adapted for being disposed at a computer, the processing device comprising:
   a control module having a counter, and the counter generates a parameter selecting signal according to a triggering signal while a memory is not successfully driven;
   a BIOS selecting a driving parameter according to the parameter selecting signal from a look-up table and loading the driving parameter; and
   a driving module for driving the memory according to the driving parameter.

7. The processing device according to claim 6, further comprising:
   a triggering signal generating module generating the triggering signal and transmitting the triggering signal to the control module.

8. The processing device according to claim 7, wherein the triggering signal generating module has a button or a switch.

9. The processing device according to claim 6, wherein the driving parameter is recorded in a look-up table and the driving parameter includes an operating voltage parameter and a timing controlling parameter provided for the BIOS to drive the memory.

10. The processing device according to claim 6, wherein the memory is a random access memory (RAM).

11. The processing device according to claim 6, wherein the processing device is disposed on a motherboard of the computer.

12. The processing device according to claim 6, further comprising a storage module storing the look-up table.

* * * * *